(No Model.)  
ST. GEORGE L. FOX.  
PLANTE'S SECONDARY BATTERY.
No. 285,807. Patented Oct. 2, 1883.
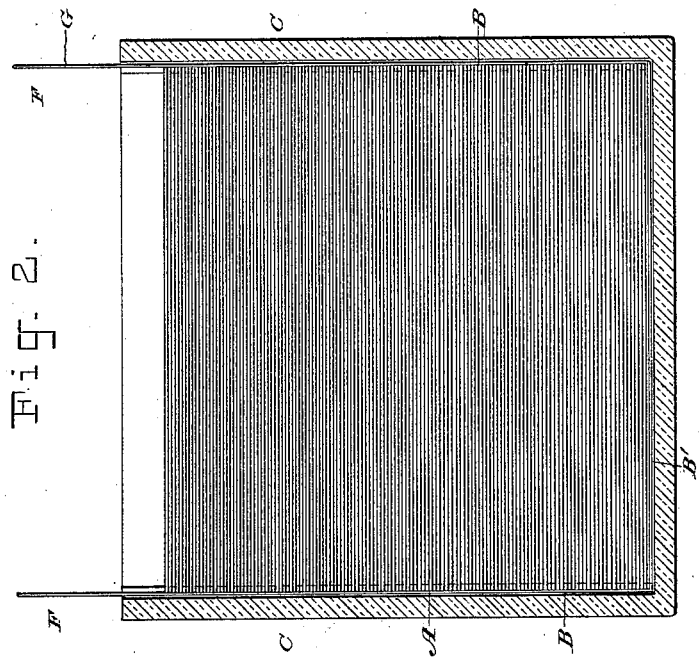
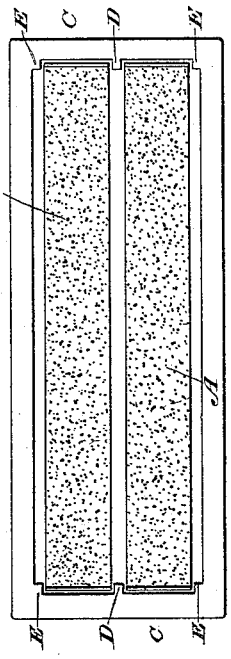
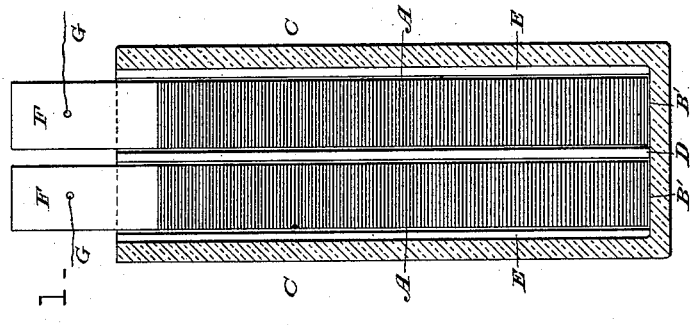
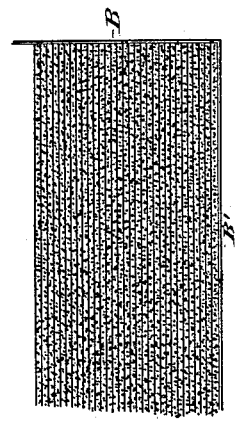
WITNESSES:
INVENTOR:
St George Lane Fox
By his Attorneys, (No Model.) 2 Sheets—Sheet 2.
ST. GEORGE L. FOX.
PLANTE'S SECONDARY BATTERY.
No. 285,807. Patented Oct. 2, 1883.
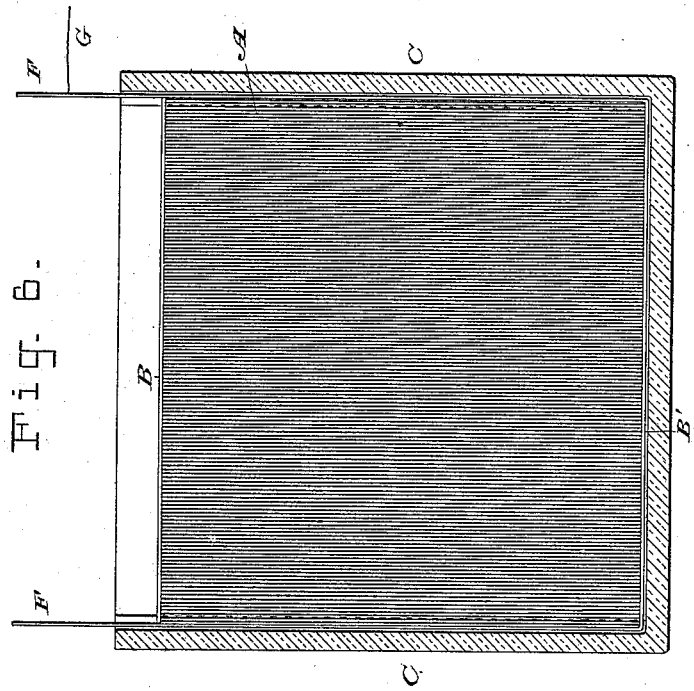
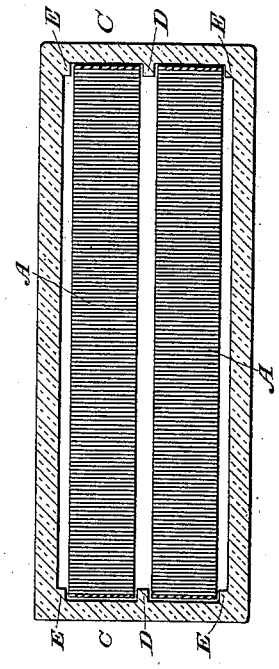
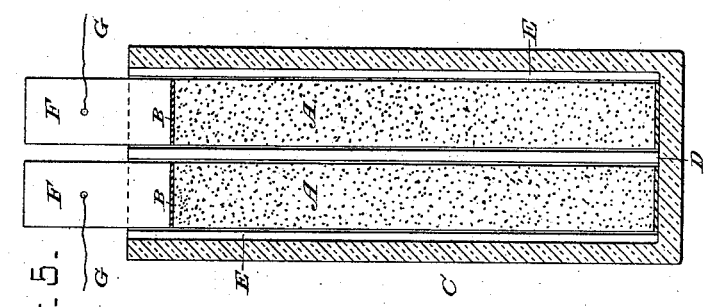
WITNESSES.
INVENTOR:
St. George Loane Fox
By his Attorneys,

UNITED STATES PATENT OFFICE.

ST. GEORGE LANE FOX, OF LONDON, ENGLAND.

PLANTÉ'S SECONDARY BATTERY.

SPECIFICATION forming part of Letters Patent No. 285,807, dated October 2, 1883.

Application filed January 22, 1883. (No model.) Patented in England September 29, 1882, No. 4,625.

*To all whom it may concern:*

Be it known that I, ST. GEORGE LANE FOX, of London, England, have invented certain Improvements in Planté's Secondary Batteries, of which the following is a specification.

My invention relates to Planté's secondary or storage batteries, wherein lead plates are employed immersed in a dilute solution of sulphuric acid. The action of these batteries is well understood, their charging by the electric current developing a coating of peroxide of lead on one plate and of spongy lead on the other, by which means the plates are polarized and rendered capable of giving back a reverse current. The storage capacity of such batteries is limited by the area of surface of the lead plates that is exposed to the action of the acid solution; and the principal object of my invention is to greatly increase the extent of such surface without adding to the weight of the cell, or, conversely, to make a battery of the same storage capacity as heretofore, but of very much less weight. Several attempts have heretofore been made to accomplish this desideratum, but they have been attended with but indifferent success. In the constructions referred to lead-foil has been used in different ways, the several layers or laminæ being separated by the intervention of various substances—such as paper, parchment, powdered coke, and divers metallic oxides. The coke and oxides have an electrical action which interferes with the functions of the battery as a storage-battery, and causes it to act to some extent as a generator of electricity, and they also, in common with the paper or parchment, afford too ready a conduction between the superposed laminæ, and so accelerate the discharge of the battery, a result which is disadvantageous, since it is desirable that a secondary battery shall discharge itself as slowly and uniformly as possible. My improved battery is designed to be free from these and other defects of the batteries heretofore constructed. I take a number of strips of thin lead plate—preferably lead-foil—and superpose them one upon another, with intervening granules of a non-absorbent, non-conducting, and electrically inert material—as sand or powdered glass—distributed over the surfaces of the lead plates in such a manner as to keep them slightly separated, and yet leave capillary interstices between the granules, which admit the acid solution to the surfaces of the several laminæ. I press together all the laminæ or layers of foil, so as to form a thick plate composed thus of laminæ of lead-foil and the intervening granules of sand or glass, and I connect together all the laminæ forming this plate by solder at the side or sides or top or bottom. I place two or more of these laminated plates in a suitable vessel containing dilute sulphuric acid, arranging them in such manner that the edges of the laminæ of one plate or electrode are opposed to but do not touch the edges of the laminæ of the other plate or electrode.

In the annexed drawings, Figure 1 is a cross-section; Fig. 2, a longitudinal section, and Fig. 3 a plan of secondary battery composed of two lead plates which are constructed and arranged as above described, the laminæ being placed horizontally. Fig. 4 is a view on an enlarged scale, showing more clearly the laminæ of lead and separating-granules of sand or glass. Figs. 5, 6, and 7, are similar views to Figs. 1, 2, and 3 of a battery with the laminæ placed vertically.

A A are the lead plates, each made of a number of laminæ with the granules of inert separating material between them, and pressed together, so as to form a thick plate. All the laminæ forming a plate are connected together by lead or solder B B, and in the horizontal arrangement, Figs. 1, 2, 3, and 4, there is a thick strip of lead, B', at the bottom to support the laminæ when the plate is being lifted. The two plates A A are placed, as shown, in a vessel, C, of glass or other suitable material, containing dilute sulphuric acid, the edges of the laminæ of the one plate being opposed to but not touching the edges of the laminæ of the other plate.

D D are ribs in the vessel C to keep the plates A A apart, and E E are projections or corner-pieces to keep them from contact with the sides of the vessel, so that the liquid may have access to the plates all around. The lead or solder B is extended above the vessel, as seen at F F, to allow the wire terminals G G to be connected thereto, and also to form handles for lifting the plates.

Any number of battery-cells constructed as described may be connected up to form a secondary battery.

The distinguishing feature of my battery is the use, as the separating medium between the laminæ, of a material which is electrically inert or neutral, is a non-conductor of electricity, is insoluble in the acid solution, and which is composed of non-porous granules with interstices between them, which permit the entrance of the exciting-liquid between the laminæ and give it access to substantially the entire surface of every lamina or strip of foil. Sand possesses these properties in a remarkable degree, and is preferred for the purpose, although powdered glass makes a good substitute for it. The insulating effect of the intervention of granules of sand or the equivalent substance between the layers insures the slow and uniform discharge of the battery, which is desirable, as one annoying defect of many secondary batteries is the rapidity of their discharge, it being necessary to substitute a spent for a charged battery at inconveniently frequent intervals.

Of the many attempts to utilize lead-foil for making secondary batteries, the one which, perhaps, most nearly approaches mine in general arrangement employs laminated plates placed in similar manner to mine, but with any intervening substance between the laminæ of the foil, the latter being merely doubled under at their ends, so that their central or intermediate portions are compressed to only half the extent of their ends, thereby leaving some slight opportunity for the liquid to permeate between some of the layers. Another suggested battery is built up of sheets of lead-foil connected alternately to the opposite electrodes, like the plates of a condenser, their surfaces coated with lead oxide or other metallic oxides and separated by sheets of paper or vegetable parchment. Another form of secondary battery consists of sheets of lead coated with metallic oxides and chlorides, or with a mixture of "Weldon mud" (impure manganese oxide with some manganese chloride) and powdered coke. None of these are electrically neutral or non-conducting substances, nor are they used to keep laminæ of lead separated and permit the circulation of the exciting-liquid between them.

I am aware that thick sheets of asbestus-board have been placed between the opposite plates of secondary batteries; but this is not the equivalent of my invention, which has for its object to mechanically separate the several laminæ of the same plate, the laminæ thus separated being of like potential. I also employ separating granules or grains of the inert material, as before stated, and not sheets.

What I claim, and desire to secure by Letters Patent, is—

1. A secondary battery the plates or electrodes of which consist each of a number of sheets or plates of lead placed face to face, and separated by granules of a non-conducting and electrically-neutral material, as sand, substantially as and for the purposes set forth.

2. A plate or electrode for a secondary battery, consisting of a number of laminæ of lead alternated with sand, pressed together and fastened to a metallic strip, with which the edges of the laminæ are in electrical connection, substantially as set forth.

In witness whereof I have hereunto signed my name in the presence of two subscribing witnesses.

ST. GEORGE LANE FOX.

Witnesses:
  WILLIAM DAVID BARNETT,
    39 *Threadneedle Street, London.*
  THOMAS JOHN OSMAN,
    17 *Gracechurch Street, London.*